Nov. 18, 1947.   H. N. SHELMERDINE ET AL   2,431,085
SHEATHING OF BUOYANT CABLES
Filed Sept. 8, 1944
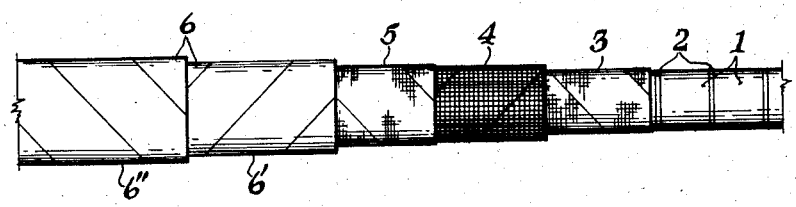
Henry Neal Shelmerdine
& Alfred Cooper,
                    Inventors
By
                    ATTY.

Patented Nov. 18, 1947

2,431,085

UNITED STATES PATENT OFFICE 2,431,085

SHEATHING OF BUOYANT CABLES

Henry Neal Shelmerdine and Alfred Cooper, Croydon, England, assignors to Expanded Rubber Company Limited, Croydon, England Application September 8, 1944, Serial No. 553,293
In Great Britain June 27, 1941

4 Claims. (Cl. 154—2.26)

This invention relates to the sheathing of buoyant cables.

In the production of buoyant cables it has been the practice for some time to use a core, composed of a series of expanded ebonite cylindrical beads or blocks, between which are located circular discs of soft expanded rubber, around which a strip of thin cloth is wound spirally, a conductor being wound around the cloth and in turn a second strip of thin cloth is wound spirally around the conductor, the whole being enclosed in tough rubber sheathing. The rubber sheathing is usally formed of one or more strips of rubber wound spirally.

In order to form the completed cable, it is necessary to vulcanize the sheathing and this usually takes about 10 hours at 100° C. either by a lead press process or in open steam.

By providing the cable with a core as above described, the cable has sufficient flexibility to enable it to be wound on a drum.

Ebonite commences to soften at 70° C. and at temperatures above this and up to 100° C. it becomes quite plastic. Expanded ebonite consists of a closed or disconnected cell structure which may be compared with an agglomeration of minute balloons. As a result of the heating these soften and consequently the beads or blocks are considerably distorted. In some cases, the cells burst and the beads or blocks shrink as a result of gas diffusion.

The discs of soft expanded rubber behave in a similar way when subjected to temperatures of 95° C. and above.

It will thus be seen that when the sheathing is vulcanized in the known manner, the resultant cable is liable to lose its buoyancy.

It is the object of the present invention to provide a flexible cable of the type above described with sheathing which can be vulcanized at a temperature which does not exceed 70° C. and thus eliminates the disadvantages above referred to.

According to the present invention a process for sheathing buoyant cables of the type above referred to comprises preparing a rubber mix without sulphur but including an accelerator sufficiently fast to enable the rubber to be vulcanized if necessary at room temperature when sulphur is added to the mix; calendering the mix into a sheet entirely free from chalk and just prior to calendering, incorporating the necessary sulphur for vulcanization and finally winding strips of the calendered sheet around a core comprising the conductor and closed cell expanded rubber material and vulcanizing the sheathing thereon at a temperature not exceeding 70° C.

A large number of accelerators are useful for the purpose and may be divided into three classes which may be referred to as fast accelerators, semi-ultra-fast accelerators and ultra-fast accelerators.

For the purpose of the invention there may be used, for example, benzothiazole derivatives, such as mercapto benzo-thiazole, thiuram sulphides, such as tetramethyl thiuram monosulphide and disulphide, dipenta methylene thiuram tetra-sulphide and disulphide, salts of dithio acids, such as zinc diamethyl dithio carbamate and corresponding salts in which the dimethyl group is replaced by diethyl, dibutyl and pentamethylene, zinc butyl zanthate, zinc or sodium isopropyl zanthate, piperidine pentamethylene dithio carbamate and piperidine monocarbothionalate. These accelerators may be used separately or any two or more in combination.

The accelerator is selected so as to give a correct balance between satisfactory processing free from pre-curing or scorching tendencies and rapid vulcanization.

A suitable rubber compound for use according to the invention consists for example of—

| | Parts by weight |
|---|---|
| Rubber | 100 |
| Zinc oxide | 10–50 |
| Anti-oxidant | 1–2 |
| Softener | 1–2 |
| Accelerator | ¼–1 |
| Sulphur | ½–2 |

The rubber compound may also consist of the following ingredients—

| | Parts by weight |
|---|---|
| Raw rubber | 100 |
| Zinc oxide | 5 |
| Soft carbon black | 10–50 |
| Anti-oxidant | 1–2 |
| Softener | 1–2 |
| Accelerator | ¼–1 |
| Sulphur | ½–2 |

In the above examples about half the rubber may be replaced by reclaimed rubber.

The above compounds may include any suitable filler.

For the purpose of forming the compound the rubber is first masticated. Then follows the mixing operation during which all ingredients, with the exception of the sulphur, are added, care being taken that the temperature in the mill does not exceed 60° C.

The sulphur is added to the mix during the pre-warming process just prior to the calendering by which the mix is formed into a sheet entirely free from chalk. This sheet is then cut into strips of suitable width. These strips are wound in spiral form, preferably in overlapped relation, comprising expanded rubber material as hereinafter described, around a core so as to form a sheathing which is allowed to vulcanize by storing. The vulcanization may however, be accelerated by heating to a temperature not exceeding 70° C. By this heating the vulcanization may be effected in one or two days or even less according to the accelerator or mixture of accelerators used.

If desired, the sheating may be formed of two layers, the second layer being wound spirally in the opposite direction to the first layer.

As no chalk is present, the overlapping portion of the spirally wound strip or strips, or the superposed strips when two layers are used, stick together so as to form a closed tube. In this manner a sheathing of any desired length may be formed.

Before storing or vulcanizing the sheathing is preferably coated on the outside with chalk and a wet cloth is wrapped around the same so as to hold the rubber securely and firmly against the core.

As illustrated in the drawing, the core is preferably formed of cylindrical blocks or beads 1 of expanded ebonite arranged alternately with discs 2 of soft expanded rubber or wood. The blocks or beads are, for example, three inches in length and about three inches in diameter, whilst the rubber discs are about ⅜ to ½ an inch thick. These dimensions are only given by way of example as they may be varied according to the size of the cable.

The core may also be formed of expanded rubber beads arranged alternately with wooden discs ¼ of an inch in thickness, these discs serving to prevent the rubber beads from being crushed when an electrical conductor is stranded round the core.

It is also possible to form the core of expanded plastic beads arranged alternately with expanded synthetic rubber discs.

If desired, the core may be formed of different arrangements of the various elements.

Around this core there is placed a spiral winding 3 of thin cloth, around this the conductor 4 is wound in a loose or other helix and then around the latter there is wound a further spiral winding 5 of thin cloth. Around this core there is then wound the rubber mix to form the sheathing 6 when a buoyant cable is required.

The rubber mix, which may be applied in the form of one layer 6' or two layers 6' and 6'' as above described, is then vulcanized by storing or heating to a temperature not exceeding 70° C.

We claim:

1. A process for sheathing buoyant cables of the type hereinbefore referred to which comprises preparing a rubber mix without sulphur but including an accelerator sufficiently fast to enable the rubber to be vulcanized if necessary at room temperature when sulphur is added to the mix; calendering the mix into a sheet entirely free from chalk and just prior to calendering, incorporating the necessary sulphur for vulcanization, and finally winding strips of the calendered sheet around a core comprising the conductor and closed-cell expanded rubber material and vulcanizing the sheathing thereon at a temperature not exceeding 70° C.

2. A process according to claim 1, wherein the sheet is cut into strips which are wound spirally around a core, so as to form a sheathing, and vulcanizing the sheathing at a temperature not exceeding 70° C.

3. A process according to claim 1, wherein the core is formed of cylindrical blocks of hard expanded plastic material arranged alternately with discs of soft expanded plastic material.

4. A process for producing a sheathed cable which comprises the following steps in the order named: (a) placing a spiral winding of thin cloth around a core composed of a series of expanded ebonite blocks with interposed discs of soft expanded rubber; (b) winding a conductor in a helix around the cloth, a further spiral winding of thin cloth being then wound around the conductor, and the whole being then enclosed by sheathing consisting of rubber strips wound spirally, the said strips being prepared from a rubber mix containing an accelerator sufficiently fast to enable the rubber to be vulcanized at room temperature when sulphur is added to the mix, the said mix being calendered into a sheet entirely free of chalk and just prior to calendering having the necessary sulphur for vulcanization incorporated, whereupon the sheathing so formed is vulcanized at a temperature not exceeding 70° C.

HENRY NEAL SHELMERDINE.
ALFRED COOPER.

REFERENCES CITED

The following references are of record in the file of this patent:

UNITED STATES PATENTS

| Number | Name | Date |
| --- | --- | --- |
| 1,601,092 | Weigel | Sept. 28, 1926 |
| 1,659,371 | Merrill | Feb. 14, 1928 |
| 2,186,793 | Woatke | Jan. 9, 1940 |
| 2,216,136 | Roberts | Oct. 1, 1940 |
| 2,297,022 | Pfleumer | Sept. 29, 1942 |
| 2,327,931 | Ratner | Aug. 24, 1943 |

FOREIGN PATENTS

| Number | Country | Date |
| --- | --- | --- |
| 334,840 | Great Britain | Sept. 9, 1930 |
| 466,304 | Great Britain | Mar. 26, 1937 |